United States Patent [19]

Calhoun

[11] 4,312,124
[45] Jan. 26, 1982

[54] MULTIPLE TUBE PULLING APPARATUS

[75] Inventor: Gregory L. Calhoun, Lutz, Fla.

[73] Assignee: Westinghouse Electric Corp., Pittsburgh, Pa.

[21] Appl. No.: 97,771

[22] Filed: Nov. 27, 1979

[51] Int. Cl.³ .......................................... B23P 19/02
[52] U.S. Cl. ...................................... 29/726; 29/252
[58] Field of Search ................... 29/727, 426.5, 426.6, 29/726, 252

[56] References Cited

U.S. PATENT DOCUMENTS

| | | | |
|---|---|---|---|
| 3,791,011 | 2/1974 | Keys | 29/726 X |
| 3,835,520 | 9/1974 | Sismore | 29/726 |
| 4,053,062 | 10/1977 | Travis | 29/726 X |
| 4,125,928 | 11/1978 | Cawley | 29/426.5 X |
| 4,213,239 | 7/1980 | Filer | 29/252 |
| 4,214,362 | 7/1980 | Beard | 29/726 |
| 4,216,893 | 8/1980 | Glatthorn | 29/726 X |
| 4,227,854 | 10/1980 | Coffey | 29/726 X |

*Primary Examiner*—Jimmy C. Peters

*Attorney, Agent, or Firm*—E. F. Possessky

[57] ABSTRACT

A multiple tube pulling apparatus for pulling, at one time, a plurality of stub-tubes from the tubesheet of a steam generator. Each tube gripping apparatus of the plurality is expanded into gripping arrangement by an axially retracted tapered rod. As the internal diameter of each stub-tube can vary, the amount of axial movement of each tapered rod to provide proper gripping engagement also varies. The present invention provides a single hydraulic cylinder for axially moving the plurality of tapered rods and includes spring members connecting each tapered rod to the hydraulic cylinder to accommodate the variations in axial movement of each rod necessary to obtain the proper gripping engagement for each stub tube. Further, a spring biased guide block maintains the gripping tubes on proper centers corresponding to the stub-tube centers and once the stub-tubes are removed from the tubesheet, the guide block pushes the stub-tubes off the tube gripping apparatus freeing the apparatus for another operation.

8 Claims, 6 Drawing Figures

MULTIPLE TUBE PULLING APPARATUS

BACKGROUND OF THE INVENTION

1. Field of the Invention:

This invention relates to a tube puller for removing heat exchanger tubes from a tubesheet of a steam generator and more particularly to such apparatus for removing, during one pulling stroke, a plurality of such tubes.

2. Description of the Prior Art:

Hydraulically operated tube pulling apparatus for removing heat exchanger tubes from a heat exchanger such as a steam generator are known. Typically, such apparatus includes a tube gripping member, disposed within the end of the tube to be removed and expanded into gripping engagement with the interior surface of the tube. The gripping member is connected to an operating rod of a hydraulic cylinder that pulls the tube from the tubesheet in which it is mounted.

The expandable gripping member typically includes an externally toothed tube capable of being expanded into engagement with the inner surface of the heat exchanger tube by an axially tapered rod which, upon being moved axially within the gripping member, expands the gripping tube into a proper gripping engagement. Such tube pulling apparatus can be made to operate quite well, especially when a proper gripping relationship is established between the gripping surface of the expandable member and the inner surface of the heat exchanger tube. One factor in establishing this proper relationship is the radially expanding force provided by the internal tapered rod which expands the gripping member. Thus, for any one tube to be removed, the tapered rod must be positioned axially to a point resulting in such expanding force and gripping relationship being established.

In removing the tubes (or tube stubs) of a nuclear steam generator, it is preferable to increase the speed of the tube removal process (and thus reduce the personnel exposure to the irradiated equipment) by having tube pulling apparatus capable of removing a plurality of tubes upon each retraction of the hydraulic pulling cylinder. However, as the final axial position of each tapered rod for expanding the expandable tube into the proper or effective gripping relationship within the associated stub tube, can vary for each tube stub to be removed, a single automatic member which positions a plurality of such tapered rods must permit each individual tapered rod to attain the proper axial position without altering or affecting the ability of each of the other tapered rods in the group to achieve an axial position for establishing a like gripping engagement for each of the other tubes.

SUMMARY OF THE INVENTION

The present invention, in that it is primarily adapted for removing tube stubs from a nuclear steam generator, includes a plurality of tube gripping members mounted on a single hydraulic pulling jack for pulling the tube stub from the tube sheet. The gripping force is established by each gripping member having an axially movable tapered expanding rod extending therethrough, with the tapered rods commonly mounted to another hydraulic cylinder that axially retracts, as a group, each rod to expand the gripping surface of the associated gripping member into an effective gripping engagement within the tube stub. The plurality of tapered expanding rods are attached to the retractable member through a common positioning mechanism that, within limits, permits any rod of the plurality to stop its axial movement once the proper predetermined gripping relationship is established, without effecting continued axial movement of the other commonly mounted tapered rods. Also, the present invention includes means for guiding the plurality of tube gripping members into proper alignment within the tube stubs and means for ejecting the withdrawn stubs from the gripping members once the stubs are free of the tubesheet.

DESCRIPTION OF THE PREFERRED EMBODIMENT

Figure 1:
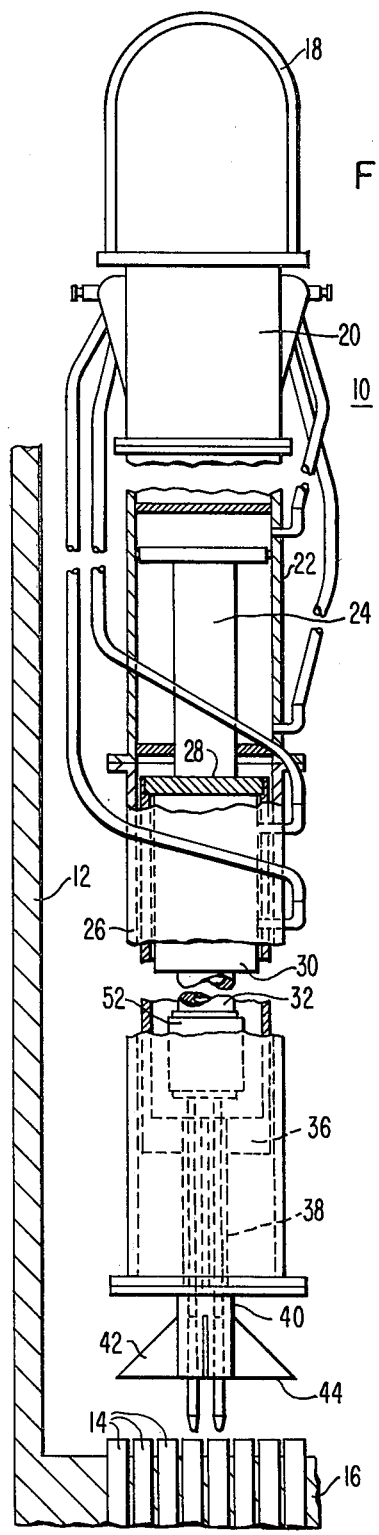
FIG. 1 is an elevational schematic view of the tube pulling apparatus of the present invention disposed above the tubesheet of a steam generator.

Referring initially to FIG. 1, the tube pulling apparatus of the present invention is seen to comprise a tool for removing the stub tubes of a nuclear steam generator once the main heat-exchanger tube bundle has been severed and removed. Thus, in accordance therewith, the tube pulling apparatus 10 is suspended from a removable crane (see commonly owned copending patent application Ser. No. 896,531 filed Apr. 14, 1978 for a description of a tool support crane in such environment) within the interior of a nuclear steam generator 12 and in a vertical position above the stub tubes 14 retained in the tubesheet 16 thereof. Thus, from the top down, the tube pulling apparatus 10 comprises a bail 18 for hanging the apparatus 10 on the crane hook, and attached to an upper post 20 on which certain hydraulic controls and manual guide handles are situated for appropriate manual control of the apparatus.

A commercially available hydraulic cylinder 22 is attached to the upper post 20. (For purposes of explanation, such cylinder 22 has been schematically shown as housing a vertically movable piston 24.) Hydraulic cylinder 22 and piston 24, comprise the tube pulling cylinder of the present invention.

The piston 24 is connected to a vertically movable housing 28 disposed within an intermediate post section 26. The housing 28 has mounted therein a second hydraulic cylinder 30 having a vertically movable piston 32 and supports, from its bottom plate 36, a plurality of vertically extending generally hollow circumferentially expandable tubes 38 for gripping the interior of the stub tubes 14. (In the instant invention there are four such expandable gripping tubes 38.) The gripping tubes 38 are enclosed in a guide tube 40 extending vertically from the intermediate post 26 and configued to fit between the stub tubes 14 projecting upwardly from the tubesheet 16. The guide tube 40 includes outwardly projecting wing portions 42 having their lowermost planar edge 44 flush with the end of the guide tube 40 to provide an enlarged base area for facing engagement on the surface of the tubesheet 16.

Thus, in operation the tool 10 is positioned by the crane to properly align the guide tube 40 over an array of four stub tubes 14, and lowered from the crane for aligned insertion of the gripping tubes 38 into each of the stub tubes 14 enclosed within the guide tube 40.

Figure 2:
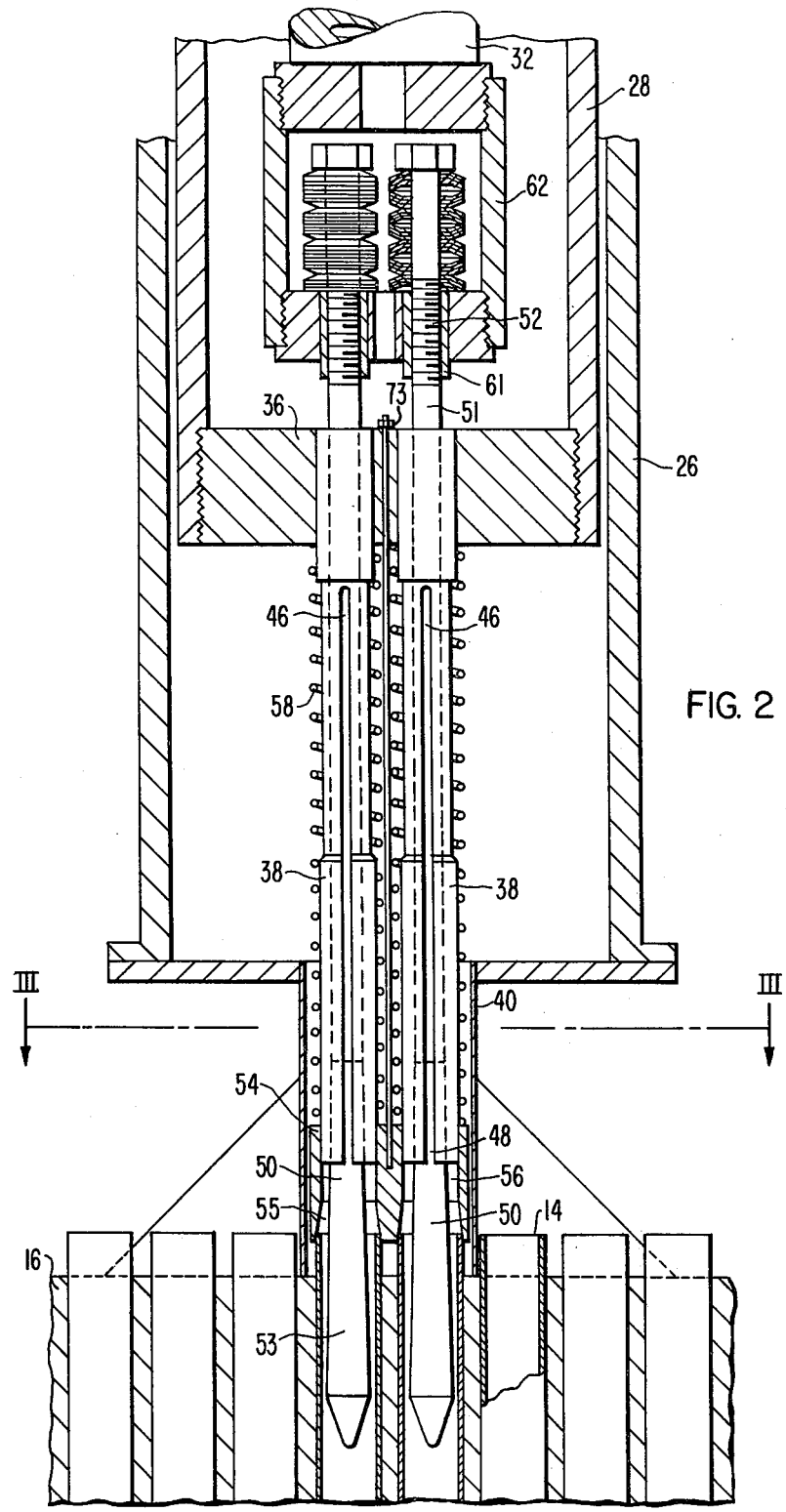
FIG. 2 is an enlarged cross-sectional view of the tube engaging end of the apparatus of FIG. 1 with the guide block thereof placing the apparatus in proper alignment with the tube stubs.

Reference is made to FIG. 2 to show the base of the guide tube 40 and wings 42 resting on the tubesheet 16 and the gripping tubes 38 in alignment for initial insertion into the stub tubes 14. As therein seen, the gripping tubes 38 are threaded at their upper end for threaded engagement with threaded aperture in bottom plate 36 of the housing 28 and it is to be understood that tubes 38 also have external threads adjacent the opposite or free end 48 for gripping engagement with the internal surface of the stub tubes 14. The gripping tubes 38 are hollow and have axial slits 46 extending for a portion of their axial length and open at the lower terminal end 48. Tapered expanding rods 50 are axially movably mounted within the gripping tubes 38 and define a relatively long axial shank portion 51, having one end 52 threaded into a sleeve 61 movably retained in an axially movable spring housing 62 (to be described later) and the opposite tapered end 53 normally extending below the terminal end 48 of the gripping tubes 38 and having an outwardly downwardly tapered configuration (i.e. frustoconical) that cooperates with the internal surface of the gripping tubes 38 so that upward axial movement of the rods 50 relative to the tubes 38, radially expands, as by camming, the gripping tubes 38 (permitted by the open ended axial slot 46) to force the external threaded surface thereof into gripping engagement with the stub tubes 14. However, in the normal relaxed position, the gripping tubes 38, with the expanding rods 50 extending therebelow, will closely fit within the stub tubes 14.

A guide block 54 is axially movably disposed within the guide tube 40 and defines an array of apertures 56 therethrough in coaxial alignment with the array of stub tubes 14 to be removed. The apertures 56 have a diameter just sufficient to permit the passage of the gripping tubes 38 therethrough and are chamfered from the bottom surface of the block 54 so that the stub tubes 14 can be seated within the chamfered area 55 with the apertures 56 thus aligned to direct the entry of the gripping tubes 38 through the block 54 and into the stub tube 14. The guide block 54 is spring biased to a lowermost position within the guide tube 40 by coil springs 58 extending between the bottom plate 36 of the movable housing 28 and the top face of the guide block 54. Thus, it is seen that as the movable housing 28 is lowered by lowering the piston 24 of pulling cylinder 22, the springs 58 become compressed in that the guide block 54 is prevented from further downward movement by abutment with the stub tubes 14.

Figure 3:
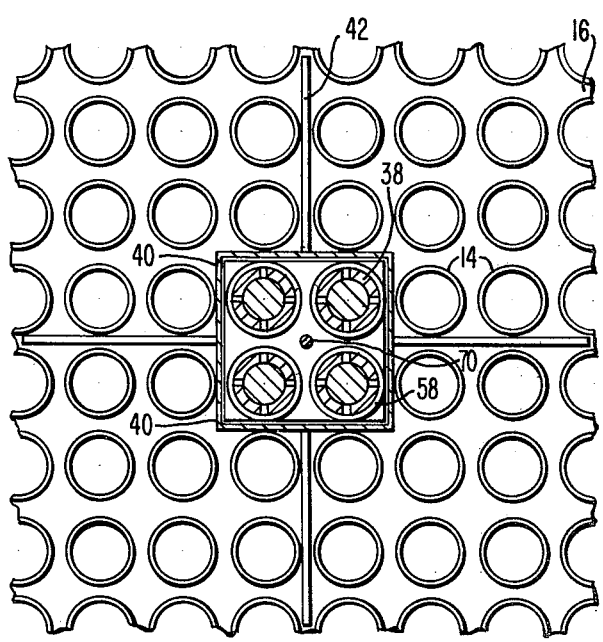
FIG. 3 is a cross-sectional view of FIG. 2 generally along lines III—III thereof.

Reference is made to FIG. 3 to show the general array of the four gripping tubes 38 of the tool 10. Thus, it is seen that the guide tube 40, in cross section, is essentially square, as is the guide block 54, with each side face of the guide tube 40 having an outwardly projecting wing 42 such that the tube 40 and wing 42 structure fits between adjacent rows and columns of the stub tubes 14 in the tubesheet 16 to permit it to rest against the face of the tubesheet.

Figure 4:
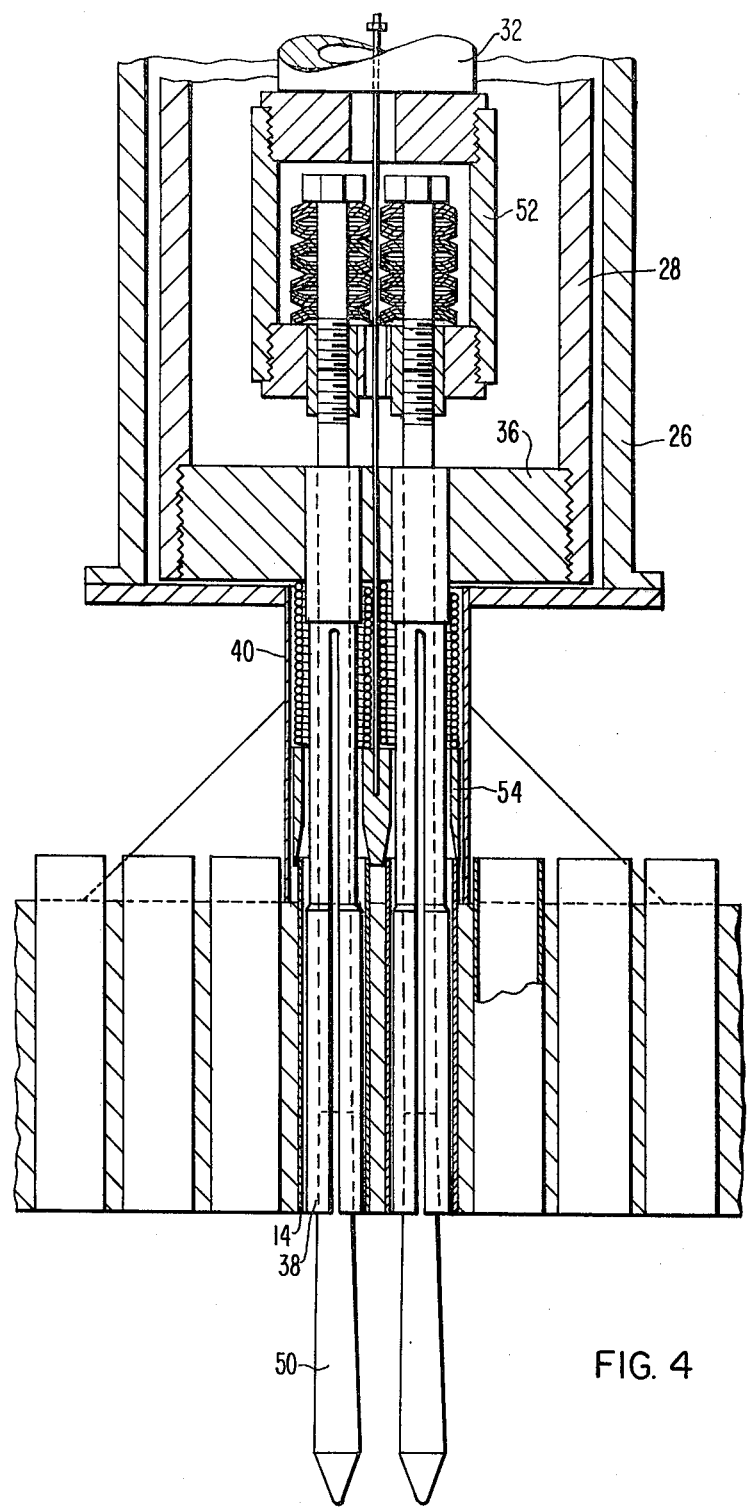
FIG. 4 is a cross-sectional view similar to FIG. 2 showing the tube expanding tapered rods extending through the tubesheet of the steam generator.
Figure 5:
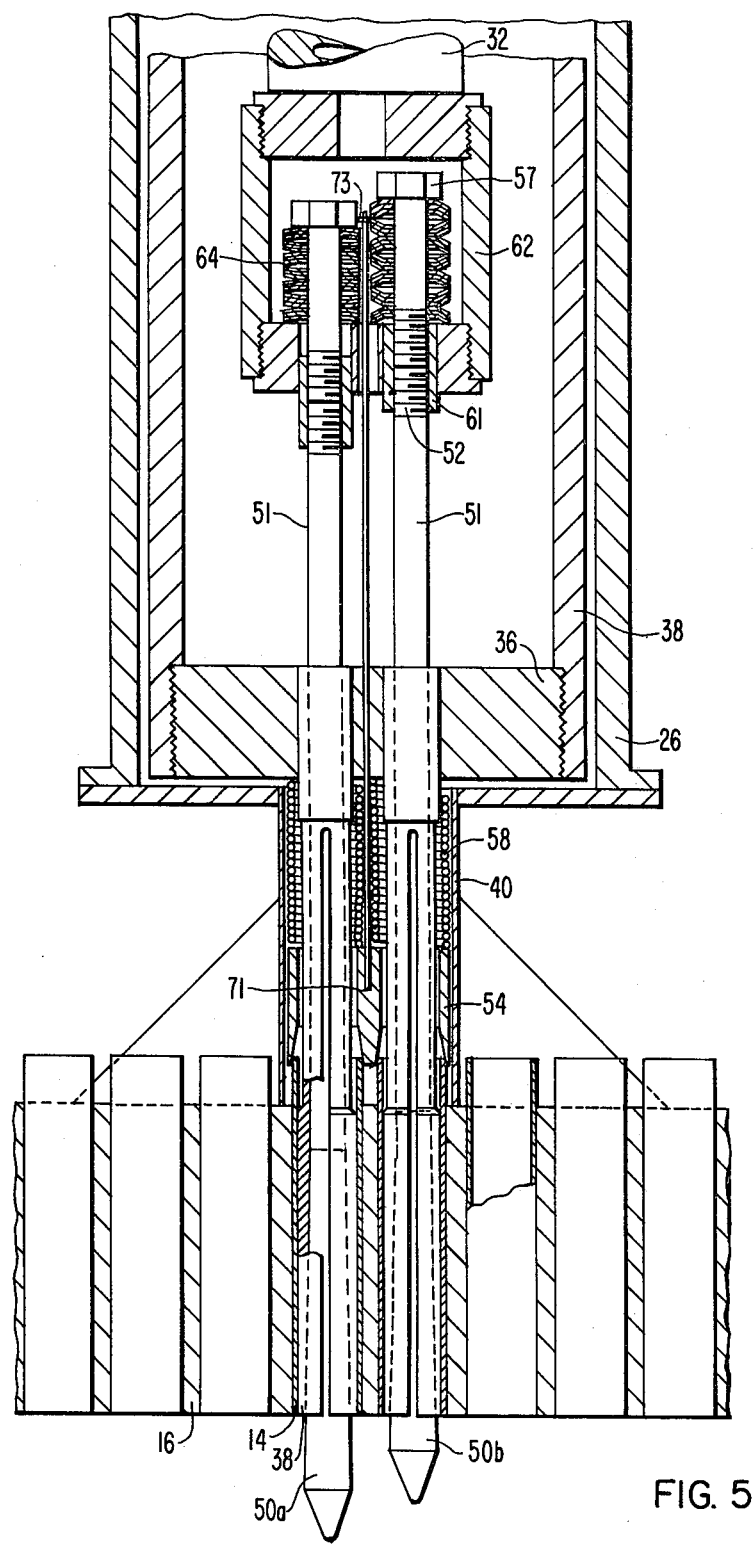
FIG. 5 is a cross-sectional view similar to FIG. 4 showing the tube expanding tapered rod retracted into the expandable gripping tube to place the gripping tube in a gripping engagement within the tube stub.
Figure 6:
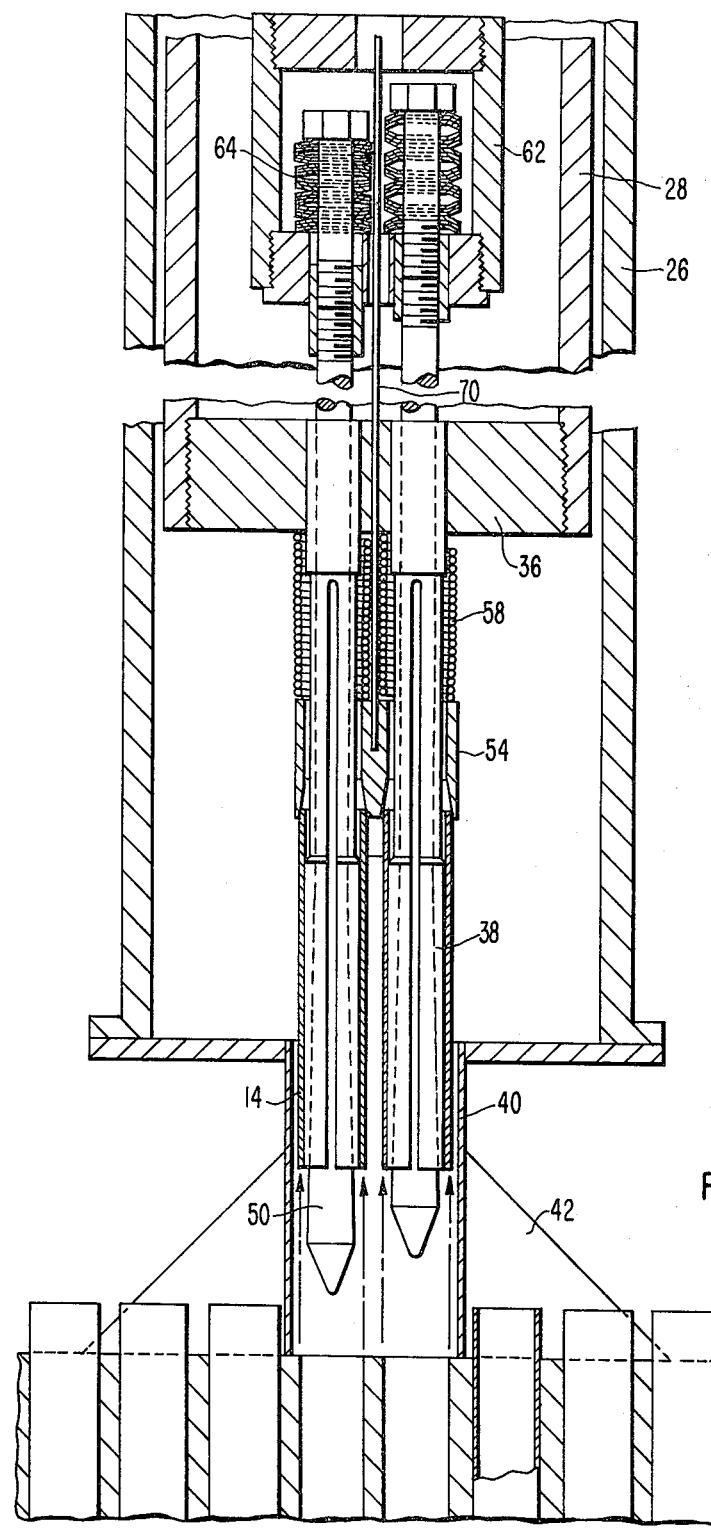
FIG. 6 is a cross-sectional view similar to FIG. 5 showing the tube stubs removed from the tubesheet by the tube pulling apparatus.

FIGS. 4 through 6 in conjunction with FIG. 2 show the sequence of operation for stub tube removal. Thus, as previously stated, the relative position of the components as shown in FIG. 2 is achieved by the crane lowering the tube removal tool 10 onto the tubesheet 16 in alignment with the stub tubes to be removed. From this position, the movable housing 28 is hydraulically lowered to place the gripping tubes 38 within the stub tubes 14 in alignment with that portion of the stub tubes within the tubesheet 16 as shown in FIG. 4. Lowering the housing 28 also lowers the expanding tapered rods 50 so that the gripping tubes 38 remain unexpanded and in a relaxed position.

From this position, the expanding cylinder 30 is actuated to retract, through retraction of rod 32 and spring housing 62, the expanding tapered rods 50 upwardly as shown in FIG. 5 to expand the gripping tubes 38 into gripping engagement with the stub tubes 14. However, because of permitted dimensional differences (i.e. the internal diameter of adjacent stub tubes could differ by permitted tolerances, or the outer diameter of the expandable gripping tubes 38 and/or the other diameter or taper of the tapered expanding rod 50 could be different within permitted tolerances) the amount of axial movement of one expanding tapered rod (such as 50a) may be sufficient to expand the associated gripping tube 38 into such gripping engagement before there is sufficient axial movement of any of the remaining rods to provide the same gripping relationship between the other gripping tubes 38 and stub tubes 14. Thus, further axial movement of the other expanding rods such as 50b within the group is required to obtain this gripping engagement. To permit such further axial movement of any of the other rods 50 while any rod within the group remains in an axial position where the gripping engagement was established, the expanding tapered rods 50 are mounted to the piston 32 of the expanding cylinder 30 through the spring housing 62 and a spring mechanism 64 housed therein. Thus, the upper end 51 of each expanding rod 50 is received in the housing 62 which is attached to the expansion piston 32. A stack of Belleville washers 64 is interposed between the enlarged top 57 of the rod shank 51 and the base 63 of the housing 62. The Belleville washers 64 have a spring constant that permits deflection of the washers only after an appropriate upward force is exceeded, which force corresponds to the force transmitted thereto when the associated expandable gripping tube 38 has been expanded into proper gripping engagement within a stub tube 14. Further upward movement of the housing 62 only deflects the Belleville washers of that expanding rod 50a without axial movement of the rod. The washers 64 are stacked in the alternating arrangement shown to obtain sufficient axial deflection of the stacked washers to accommodate the variable axial movement of the rods anticipated due to the dimensional variations expected. Thus, once all the expanding rods 50 of the group have expanded the gripping tubes 38 into the gripping engagement, the hydraulic pulling cylinder 22 is actuated to riase the piston 24 which raises the gripping tubes 38 and expanding pins concomitantly (i.e. the pulling force is transmitted to the tubesheet through the tube portion 26 and guide tube 40 and attached wings 42) and ultimately pulls the stub tubes 14 free of the tubesheet 16 as shown in FIG. 6.

Once the stub tubes 14 are free of the tubesheet, the crane can elevate the tool and move it to any desired location. Then the piston 32 of the expanding cylinder 30 is lowered to relieve the expanding force of the tapered rods 50 on the expandable gripping tubes 38, permitting the diameter of each tube 38 to relax to the normal smaller outer diameter whereupon the force of the compression springs 58 on the guide block 54 forces the stub tubes 14 off the gripping tubes 38, freeing the apparatus for a repeat sequence.

It will be noted that the guide block 54 is limited in its axially downward position (i.e. to a spring biased initial position adjacent the open end of the guide tube) by a central rod 70, one end 71 being threaded into the top of the guide block 54, and the opposite end passing through aligned apertures in the bearing housing 62 and the hollow piston 32, and having a nut 73 threaded to its upper end which abuts the inner face of support plate 36 when the guide block is at its lowermost position.

I claim:

1. Apparatus for removing a plurality of tube stubs from a tubesheet comprising:
    a first member having a stationarily mounted casing supporting a first reciprocally mounted piston for movement in the direction of the axes of said tube stubs between a retracted and non-retracted position;
    a second member attached to said first reciprocal piston and defining a second casing supporting a second reciprocally mounted piston for movement in the direction of the axes of said tube stubs between a retracted and non-retracted position;
    a plurality of tube-gripping members, and means for supporting said gripping members from said first piston coaxial with a like plurality of said tube stubs, said gripping members defining generally cylindrical tubes having an outer diameter less than the inner diameter of said tube stubs and having axially extending slits, open at the free end, to permit radially outward expansion of said tube-gripping members;
    a plurality of tube expanding rod members and means for commonly supporting said rod members from said second piston, with each rod member extending axially through an associated tube-gripping member and having an outwardly tapered free end projecting from the free end of said tube-gripping member when said second piston is in a non-retracted position for expanding said tube-gripping member into gripping engagement within said stub tubes as said tapered end is retracted into said tube gripping members in response to said second piston being moved to said retracted position;
    whereby, once said gripping engagement between said plurality of said tube-gripping members and said stub tubes is properly established, said first piston is moved to a retracted position to remove said stub tubes from said tubesheet.

2. Structure according to claim 1 wherein said means for commonly supporting said rod members includes means for permitting separate distances of axial retraction for each said expanding rod as said second piston moves from said non-retracted position to said retracted position to permit differing amounts of radial expansion of said gripping members to provide gripping engagement of all said plurality of said gripping members with their associated stub tubes regardless of any relative dimensional variations in the various engaging parts.

3. Structure according to claim 2 wherein said means for permitting separate distances of axial retraction for each expanding rod includes:
    individual spring means for connecting each said rod to said common support means for resilient deformation from a normal position to a biased position in the direction of retraction of said rod members and wherein each of said spring means has a deformation force which is exceeded only when said rod is retracted within said tube-gripping member a distance sufficient to expand said gripping member into proper gripping engagement;
    whereby any further retraction movement by said second piston is accommodated by said deformation of said spring means without further retraction of said rod member.

4. Structure according to claim 3 wherein said individual spring means comprises a stack of Belleville washers.

5. Structure according to claim 4 wherein said stack of Belleville washers comprises a plurality of groups of said washers having alternating directions of concavity to provide sufficient axial deformation for said stack to accommodate anticipated variations in axial retraction of said expanding rods.

6. Structure according to claim 1 further including a generally tubular housing extending from said stationary casing in the direction of the axes of said tube stubs and terminating in a tubular configuration enclosing the array of plurality of tube stubs to be removed from said tubesheet, said tubular configuration further enclosing, for guided movement in the axial direction of said tube stubs, a guide block having a plurality of openings therethrough arranged in the array of the enclosed tube stubs and sized to generally closely receive said tube-gripping members therethrough and preventing the passage of the tube stubs therethrough;
    indexing means on said guide block for properly positioning said openings in coaxial alignment with said enclosed tube stubs thereby providing guided insertion of said tube-gripping members through said block and into said tube stubs as said tubular configuration is disposed over said tube stubs to rest on said tubesheet; and
    means resiliently biasing said guide block to an initial position subadjacent the free end of said gripping members, said resilient means being deformed against its bias in response to said gripping members being inserted into said tube stubs whereby, upon removal of said tube stubs from said tubesheet and release of said gripping engagement, said biasing means forces said tube stubs from said gripping members in returning to its initial position.

7. Structure according to claim 6 wherein said indexing means comprises chamfered openings on the lower face of said guide block to provide gradually enlarged openings for limited receipt therein of said tube stubs.

8. Structure according to claim 7 wherein the reactionary force to withdrawing the tube stubs from said tubesheet is transmitted to said tubesheet through said housing and tubular configuration and wherein said tubular configuration supports outwardly projecting members having a lower face flush with the lower surface of said configuration to enlarge the area subjected to said force, to reduce the stress.

* * * * *